US007992384B2

(12) United States Patent
Itakura et al.

(10) Patent No.: US 7,992,384 B2
(45) Date of Patent: Aug. 9, 2011

(54) HYDRAULIC CONTROL DEVICE OF CONSTRUCTION MACHINERY

(75) Inventors: Yoshiaki Itakura, Hiratsuka (JP); Masahiko Hoshiya, Hiratsuka (JP); Yuki Yokoyama, Oyama (JP); Junsei Tanaka, Hirakata (JP)

(73) Assignee: Komatsu Ltd., Tokyo (JP)

( * ) Notice: Subject to any disclaimer, the term of this patent is extended or adjusted under 35 U.S.C. 154(b) by 674 days.

(21) Appl. No.: 11/920,671

(22) PCT Filed: May 17, 2006

(86) PCT No.: PCT/JP2006/309841

§ 371 (c)(1), (2), (4) Date: Aug. 4, 2008

(87) PCT Pub. No.: WO2006/123704

PCT Pub. Date: Nov. 23, 2006

(65) Prior Publication Data

US 2009/0056324 A1 Mar. 5, 2009

(30) Foreign Application Priority Data

May 18, 2005 (JP) ................................ 2005-145947

(51) Int. Cl.
*F16D 31/02* (2006.01)

(52) U.S. Cl. ........................................... 60/421; 60/429

(58) Field of Classification Search .................... 60/421, 60/422, 429, 430; 91/459
See application file for complete search history.

(56) References Cited

U.S. PATENT DOCUMENTS

| | | | | |
|---|---|---|---|---|
| 5,211,014 | A | 5/1993 | Kropp | |
| 5,784,944 | A * | 7/1998 | Tozawa et al. | 91/459 |
| 7,520,130 | B2 * | 4/2009 | Tanaka et al. | 60/421 |
| 2009/0056324 | A1 * | 3/2009 | Itakura et al. | 60/421 |

FOREIGN PATENT DOCUMENTS

| | | |
|---|---|---|
| JP | 5-288203 | 11/1993 |
| JP | 6-264474 | 9/1994 |
| JP | 2004-36681 | 2/2004 |
| WO | WO 2005/019656 | 3/2005 |
| WO | WO 2005/047709 | 5/2005 |

* cited by examiner

*Primary Examiner* — Michael Leslie
(74) *Attorney, Agent, or Firm* — Fish & Richardson P.C.

(57) ABSTRACT

A hydraulic control device of construction machinery is disclosed. The device includes a main merging/diverging valve, operating levers operated to actuate plural actuators, an operating condition judging section, and a pattern collating section. When a load pressure of each actuator is high, a discharge pressure of each discharge oil path is also high, and when a total of the discharge pressures exceeds a predetermined set pressure, the main merging/diverging valve is switched to a diverging position, and when the total of the discharge pressures drops to below the set pressure, the main merging/diverging valve is switched to the merging position.

4 Claims, 9 Drawing Sheets

FIG. 4

ONE EXAMPLE OF MERGING/DIVERGING CONTROL ACCORDING TO EMBODIMENT OF THIS INVENTION

| No. | ACTUATOR No. | | | | PUMP DISCHARGE PRESSURE | MERGING· DIVERGING |
|---|---|---|---|---|---|---|
| | ①SWING | ②BOOM LIFT | ③ARM (EXCAVATION or DUMP) | ④BUCKET (EXCAVATION or DUMP) | | |
| 1 | ● | × | × | × | — | DIVERGING |
| 2 | ● | ● | — | — | — | MERGING |
| 3 | ● | × | ● | × | HIGH PRESSURE | DIVERGING |
| 4 | ● | × | ● | × | LOW PRESSURE | MERGING |
| 5 | ● | × | ● | ● | — | MERGING |
| 6 | ● | × | × | ● | HIGH PRESSURE | DIVERGING |
| 7 | ● | × | × | ● | LOW PRESSURE | MERGING |
| 8 | × | ● | × | × | — | MERGING |
| 9 | × | ● | ● | × | HIGH PRESSURE | DIVERGING |
| 10 | × | ● | ● | × | LOW PRESSURE | MERGING |
| 11 | × | ● | ● | ● | HIGH PRESSURE | DIVERGING |
| 12 | × | ● | ● | ● | LOW PRESSURE | MERGING |
| 13 | × | × | ● | × | HIGH PRESSURE | DIVERGING |
| 14 | × | × | ● | × | LOW PRESSURE | MERGING |
| 15 | × | × | ● | ● | HIGH PRESSURE | DIVERGING |
| 16 | × | × | ● | ● | LOW PRESSURE | MERGING |
| 17 | × | × | × | ● | — | MERGING |

EXPLANATORY NOTE ●: ON, ×: OFF, —: NO OBJECT

HYDRAULIC CONTROL DEVICE OF CONSTRUCTION MACHINERY

TECHNICAL FIELD

The present invention relates to a merging/diverging switching control device for hydraulic pumps and, more particularly, to a merging/diverging switching control device for discharge pressure oil from a plurality of hydraulic pumps of a construction machinery to a plurality of hydraulic actuator groups.

BACKGROUND ART

A conventional hydraulic drive device for construction machinery, such as a hydraulic excavator, disclosed in, for example, Japanese Patent Laid-Open Publication No. 2004-36681 (Patent document 1) includes: a variable capacity type first hydraulic pump driven by a drive source such as an engine; a first hydraulic actuator group driven by the pressure oil discharged by the first hydraulic pump; a first operating valve group interposed between the first hydraulic pump and the first hydraulic actuator groups; a variable capacity type second hydraulic pump driven by the drive source mentioned above; a second hydraulic actuator group driven by the pressure oil discharged by the second hydraulic pump; and a second main operating valve group interposed between the second hydraulic pump and the second hydraulic actuator group. This hydraulic drive device connects a pressure oil supply line of the first hydraulic pump and a pressure oil supply line of the second hydraulic pump via a first merging/diverging valve, and controls switching of the first merging/diverging valve, thereby switching each pressure oil supply line to a merging position or diverging position.

In addition, according to Patent document 1, in order to relieve shock that may occur during switching to a merging position or diverging position, a bypass oil path is disposed so as to connect, via a pressure compensation valve with a checking function, an oil path between the pressure compensation valve on the one hydraulic pump side and the actuator and an oil path between the other variable capacity type hydraulic pump and the main merging/diverging valve. By disposing the bypass oil path in such a manner, pressure oil can be kept flowing in a supplied-side hydraulic circuit from a supplying-side hydraulic circuit via the bypass oil path when the merging/diverging valve is switched to the diverging position from the merging position. This makes it possible to avoid a change in flow rate during the switching to the merging or diverging position, or any resultant shock. Accordingly, this prevents noises emitted when shock occurs, or operation degradation resulting from a change in flow rate or pressure.

Patent document 1: Japanese Patent Laid-Open Publication No.

DISCLOSURE OF THE INVENTION

Problem to be Solved by the Invention

However, even in the hydraulic control device disclosed in the Patent document 1 described above, a program for the control of merging/diverging switching between the plurality of actuators is extremely complex, and requires complicated preparation for the program.

It is therefore a main object of the present invention to provide a control device for switching between the merging and diverging positions of a hydraulic pump, the control device being designed so as to use a conventional merging/diverging hydraulic circuit as described above, thus eliminating the need for a complex control program for the hydraulic circuits, and ensuring accurate, smooth switching of the merging/diverging valve without shock.

Means for Solving the Problem

According to the first main feature of the merging/diverging switching control device of the hydraulic pump of present invention in order to achieve the object described above, there is provided a hydraulic control device of construction machinery, being characterized by comprising: a plurality of variable capacity type hydraulic pumps;

a plurality of actuators driven by oil discharged by the plurality of variable capacity type hydraulic pumps; a plurality of pilot-controlled directional control valves for switching directions of pressure oil supplied to the respective actuators; a plurality of working equipment operating switch valves for supplying pilot pressures to the plurality of pilot-controlled directional control valves; a plurality of operating levers for controlling switching of the respective working equipment operating switch valves; a pressure compensation valve for compensating for a difference between pressures in front of and behind each of the pilot-controlled directional control valves so that the difference between the pressures has a predetermined value; a plurality of discharge oil paths for connecting the respective variable capacity type hydraulic pumps and the plurality of pilot-controlled directional control valves; a main merging/diverging valve for switching between a merging position where the respective discharge oil paths for the respective variable capacity type hydraulic pumps are connected each other and a diverging position where the respective discharge oil paths are disconnected each other; operating condition input means for detecting pressures supplied to the pilot-controlled directional control valves; discharge pressure detecting means for detecting discharge pressures of the respective variable capacity type hydraulic pumps; and a controller, wherein the controller comprises: an operating condition judging section for judging an operating condition of each of the actuators based on a signal from the operating condition input means; an operation pattern storage section for storing operation patterns formed in advance for the respective actuators for a variety of operating positions of the plurality of operating levers; a pattern collating section for collating which one of the operation patterns stored in the storage section matches the operating condition judged by the operating condition judging section; a discharge pressure storage section for storing information about discharge pressures set in advance for the respective operation patterns stored in the operation pattern storage section; a command signal determination section for switching the main merging/diverging valve to a diverging side when a matching operation pattern is found as a result of a collation that an actual discharge pressure is higher than a set discharge pressure as a result of a comparison between the actual discharge pressure detected by each of the discharge pressure detecting means and the set discharge pressure for each of the operation patterns stored in the discharge pressure storage section, and for switching the main merging/diverging valve to a merging side when the actual discharge pressure is lower than the set discharge pressure; and a command signal output section for outputting a command signal given by the command signal determination section.

Merging/diverging switching between the actuators may be controlled using only the main merging/diverging valve.

However, the invention may further comprise: a plurality of load pressure introduction oil paths for supplying the respective pressure compensation valves with a load pressure with a highest pressure of load pressures of the plurality of actuators as a set pressure; and an auxiliary merging/diverging valve for switching between the merging position where the plurality of load pressure introduction oil paths are connected each other and the diverging position where the load pressure introduction oil paths are disconnected each other.

The invention preferably comprises control means wherein the controller switches the main merging/diverging valve from the merging position to the diverging position when the discharge pressure of one of the variable capacity type hydraulic pumps exceeds the set pressure while both the main and auxiliary merging/diverging valves are in their respective merging positions and the respective actuators are in operating condition, and then the controller switches the auxiliary merging/diverging valve to the diverging position from the merging position after discharge flow rates of the plurality of variable capacity type hydraulic pumps are adjusted. Further, this control means is capable of controlling the main and auxiliary merging/diverging valves such that the auxiliary merging/diverging valve is switched from the diverging position to the merging position when the discharge pressure of one of the variable capacity type hydraulic pumps drops to below the set pressure while both the main and auxiliary merging/diverging valves are in their respective diverging positions and the respective actuators are in operating condition, and then the main merging/diverging valve is switched to the merging position from the diverging position after the respective actuators are compensated for pressures.

Additionally, in order that merging/diverging switching between the actuators can be controlled using only the main merging/diverging valve, the invention may comprise a bypass oil path connecting, via a pressure compensation valve with a checking function, an oil path between the pressure compensation valve and the actuator on one variable capacity type hydraulic pump side and an oil path between another variable capacity type hydraulic pump and the main merging/diverging valve.

According to the second main feature of the merging/diverging switching control device of the hydraulic pump of the present invention, there is provided a hydraulic control device of construction machinery, being characterized by comprising: first and second variable capacity type hydraulic pumps; a plurality of actuators driven by oil discharged by the first and second variable capacity type hydraulic pumps; a plurality of pilot-controlled directional control valves for switching directions of pressure oil supplied to the respective actuators; a plurality of working equipment operating switch valves for supplying pilot pressures to the plurality of pilot-controlled directional control valves; a plurality of operating levers for controlling switching of the respective working equipment operating switch valves; a pressure compensation valve for compensating for a difference between pressures in front of and behind each of the pilot-controlled directional control valve so that the difference between the pressures has a predetermined value; a plurality of discharge oil paths for connecting the first and the second variable capacity type hydraulic pumps and the plurality of pilot-controlled directional control valves; a main merging/diverging valve for switching between a merging position where a discharge oil path for the first variable capacity type hydraulic pump and a discharge oil path for the second variable capacity type hydraulic pump are connected and the diverging position where the discharge oil paths are disconnected; a plurality of load pressure introduction oil paths for supplying the respective pressure compensation valves with a load pressure with a highest pressure of the load pressures of the plurality of actuators as a set pressure; an auxiliary merging/diverging valve for switching between the merging position where the plurality of load pressure introduction oil paths are connected each other and the diverging position where the load pressure introduction oil paths are disconnected each other; operating condition input means for detecting pressures supplied to the pilot-controlled directional control valves; discharge pressure detecting means for detecting discharge pressures of the first and second variable capacity type hydraulic pumps; and a controller, wherein the controller comprises: an operating condition judging section for judging an operating condition of each of the actuators based on a signal from the operating condition input means; an operation pattern storage section for storing operation patterns formed in advance for the respective actuators for a variety of operating positions of the plurality of operating levers; a pattern collating section for collating which one of the operation patterns stored in the storage section matches the operating condition judged by the operating condition judging section; a discharge pressure storage section for storing information about discharge pressures set in advance for the respective operation patterns stored in the operation pattern storage section; a command signal determination section for switching the main merging/diverging valve to the diverging position from the merging position when a matching operation pattern is found as a result of a collation that an actual discharge pressure is higher than a set discharge pressure as a result of a comparison between the actual discharge pressure detected by each discharge pressure detecting means and the set discharge pressure for each operation pattern stored in the discharge pressure storage section, and then switching the auxiliary merging/diverging valve to the diverging position from the merging position after discharge flow rates of the plurality of variable capacity type hydraulic pumps are adjusted; and for switching the auxiliary merging/diverging valve to the merging position from the diverging position when the actual discharge pressure is lower than the set discharge pressure, and then switching the main merging/diverging valve from the diverging position to the merging position after the respective actuators are compensated for pressures; and a command signal output section for outputting a command signal given by the command signal determination section.

Effects Of The Invention

The inventors discovered through experiments conducted by them that changes in the load pressures of a plurality of actuators connected to one variable capacity type hydraulic pump via respective operating valves are proportional to the discharge oil pressure of the variable capacity type hydraulic pump, and they focused on the correlation between them. The correlation exists regardless of whether each actuator is actuated alone or not. In addition, when the load pressure of each actuator increases, the discharge flow rate of the variable capacity type hydraulic pump becomes low and hence actuating speed decreases. Therefore, when the load pressure of the actuator is high, the aid of the other hydraulic pump is unnecessary. On the other hand, when the actuator is actuated at a high speed by increasing the discharge flow rate of the variable capacity type hydraulic pump, the supply of a required quantity of flow to the actuator cannot be achieved using only the one pump. In this case, the aid of the other variable capacity type hydraulic pumps is necessary.

The present invention was made in view of such facts. According to the above-described principal configuration of the present invention, in the case of a hydraulic excavator, for example, a swing movement of a swing body is usually swung at a relatively low speed and, therefore, a relatively low operating degree of an operating lever suffices. On the other hand, arm excavation requires extremely high load pressure compared to the load pressure required to swing the swing body, and it is difficult to smoothly activate the arm by use of only the single variable capacity type hydraulic pump. Further, to make arm excavation and bucket excavation simultaneous with each other, the aid of the other hydraulic pump is certainly necessary.

On the other hand, for example, to make a swing operation and a boom lift operation simultaneous with each other, the operating degree of the boom operating lever needs higher flow rate by making its operating degree higher than the operating degree of the swing operating lever. In this case, even if the respective actuators (i.e., cylinders) are independently actuated only by the corresponding variable capacity type hydraulic pumps on respective sides in order to swing the swing body and lift the boom, a required flow rate by the boom-side hydraulic pump is not obtained, making it difficult to obtain a required increase in speed. To counteract the situation, the main merging/diverging valve is switched to the merging position, thereby causing the hydraulic circuit assigned to the swing and the hydraulic circuit assigned to the boom to communicate and merge with each other, and increasing the flow rate of pressure oil in the hydraulic circuit assigned to the boom. Accordingly, the boom can be lifted at a desired speed at required load pressure. At this time, the discharge pressure of the variable capacity type hydraulic pump assigned to the swing is subject to the control of a swash plate angle so as to match the discharge pressure of the variable capacity type hydraulic pump assigned to the boom.

Where the swing movement of the swing body and the lift movement of the boom are simultaneously conducted at a low speed, the smooth operations of the swing body and boom can be retained even by independently actuating the variable capacity type hydraulic pump assigned to the swing body and that assigned to the boom within the range of a one-horse power engine while the main merging/diverging valve is kept in a diverging (i.e., blocking) position. In this case, it is not necessary to greatly increase the operating degree of the main operating valve assigned to the swing and the operating degree of the main operating valve assigned to the boom. Accordingly, it is unnecessary to supply additional oil pressure to the actuator (i.e., cylinder) from the variable capacity type hydraulic pump assigned to the swing body, in comparison with the case of merging. This prevents oil pressure loss in both the operations.

Additionally, for example, where arm excavation and bucket excavation are simultaneously conducted without swinging of the swing body such that the arm excavation at low speed and bucket excavation at regular speed are aided by the other variable capacity type hydraulic pump, the arm operating lever is set to a low degree and the bucket operating lever is set to an intermediate position. In such operating conditions of the operating levers, both the variable capacity type hydraulic pumps continue to supply pressure oil to the arm actuator (i.e., cylinder) at a required discharge pressure. When the discharge pressures of the variable capacity type hydraulic pumps exceed a preset value, it is assumed that the load pressures of the bucket actuator and arm actuator have become high. Therefore, the main merging/diverging valve is switched to the diverging position, and the hydraulic circuit assigned to the arm and that assigned to the bucket are blocked and work is continued. If the discharge pressures of both the variable capacity type hydraulic pumps decrease to below the preset value, the main merging/diverging valve is switched to the merging position, thereby causing the hydraulic circuit assigned to the arm and that assigned to the bucket to merge with each other, and continuing the arm excavation and bucket excavation.

In the present invention, operation patterns for selecting a diverging position or merging position based on each combination of the load pressures of the plurality of actuators (i.e., the discharge pressures of the hydraulic pumps) are preformed for a variety of operating conditions of the operating levers as described above, and are stored in the pattern storage section of the controller. The operation patterns formed for a variety of operating conditions of the operating levers make it possible to ensure the most efficient actuation of each hydraulic pump in each operating condition. The operating condition determining section constantly obtains the operating conditions of the operating levers and the controller is kept apprised of the information. In the controller, the pattern collating section checks an actual operating pattern in the operating condition judged by the operating condition judging section against an operation pattern stored in the operation pattern storage section. If a match is found, the comparison section compares a set discharge pressure set in advance for the corresponding operation pattern stored in the operation pattern storage section with the maximum value of actual discharge pressure of the activating hydraulic pump, thereby determining a merging or diverging position. Consequently, the main merging/diverging valve is automatically switched to the predetermined merging or diverging position based on the operation pattern.

The merging/diverging control program for the hydraulic circuits according to the present invention is such a simple program with no extreme complicated calculations, etc., that: from the correlation between the load pressure of each actuator and the discharge pressure of the corresponding variable capacity type hydraulic pump, the discharge pressure of the variable capacity type hydraulic pump is detected without detecting the load pressure of each actuator; judging from the current operating condition of the operating lever, the actual operation pattern is checked against the operation patterns stored in the controller, as described above; a preset discharge pressure corresponding to the matching operation pattern is compared with the actually detected pump discharge pressure; a determination is made whether the actual pump discharge pressure is greater than or lower than the corresponding preset discharge pressure; then, the main merging/diverging valve is automatically switched so as to merge with or diverge from the corresponding hydraulic circuit. Additionally, as in a conventional program, the program according to the present invention reduces shock occurring during switching between a merging position and diverging position, prevents oil pressure loss, and ensures efficient, smooth actuation of each actuator.

Further, where an auxiliary merging/diverging valve is provided in addition to the main merging/diverging valve as described above, the main merging/diverging valve is first switched to the diverging position from the merging position when both the main and auxiliary merging/diverging valves are in their respective merging positions and the discharge pressures of the variable capacity type hydraulic pumps exceed the set pressure. In this case, after the discharge flow rates of the variable capacity type hydraulic pumps are adjusted, the auxiliary merging/diverging valve is switched from the merging position to the diverging position. In addition, if the discharge pressure of one of the variable capacity type hydraulic pumps drops to below the set pressure when both the main and auxiliary merging/diverging valves are in their respective diverging positions and the actuators are being activated, the auxiliary merging/diverging valve is first switched to the merging position from the diverging position. Subsequently, each actuator is compensated for the pressure, and the main merging/diverging valve is switched to the merging position from the diverging position.

As a result, switching from merging to diverging can be smoothly carried out even during work without causing shock arising from a change in a flow of pressure oil. In addition, even after switching from merging to diverging, each variable capacity type hydraulic pump can be independently controlled. This reduces diverging loss when diverging takes place. Further, if any actuator should require discharge amount corresponding to more than one pump during work, the stream is switched to merging. When this discharge amount has become unnecessary, the stream can be switched to diverging. This prevents such a problem that a sufficient operating speed cannot be obtained by the actuator alone due to the diverging state. Accordingly, the optimal distribution of flow is constantly ensured whether the stream merges or diverges.

On the other hand, as described above, even where the bypass oil path is disposed without an auxiliary merging/diverging valve such that the oil path between the pressure compensation valve and actuator on the one variable capacity type hydraulic pump side and the oil path between the other variable capacity type hydraulic pump and the main merging/diverging valve are connected via the pressure compensation valve with the checking function, shock can be minimized when switching between merging and diverging takes place using only the main merging/diverging valve. The pressure compensation valve with the checking function comprises a non-return function that admits only inflow of pressure oil in the direction of the pressure oil supply, and a control function that is synchronized with the supplied-side operating valve and closes the bypass oil path when the operating valve is closed.

BRIEF DESCRIPTION OF THE DRAWINGS

FIG. 4 is a chart illustrating operation patterns for merging/diverging control according to the first embodiment.

EXPLANATIONS OF REFERENCE NUMERALS

Figure 1:
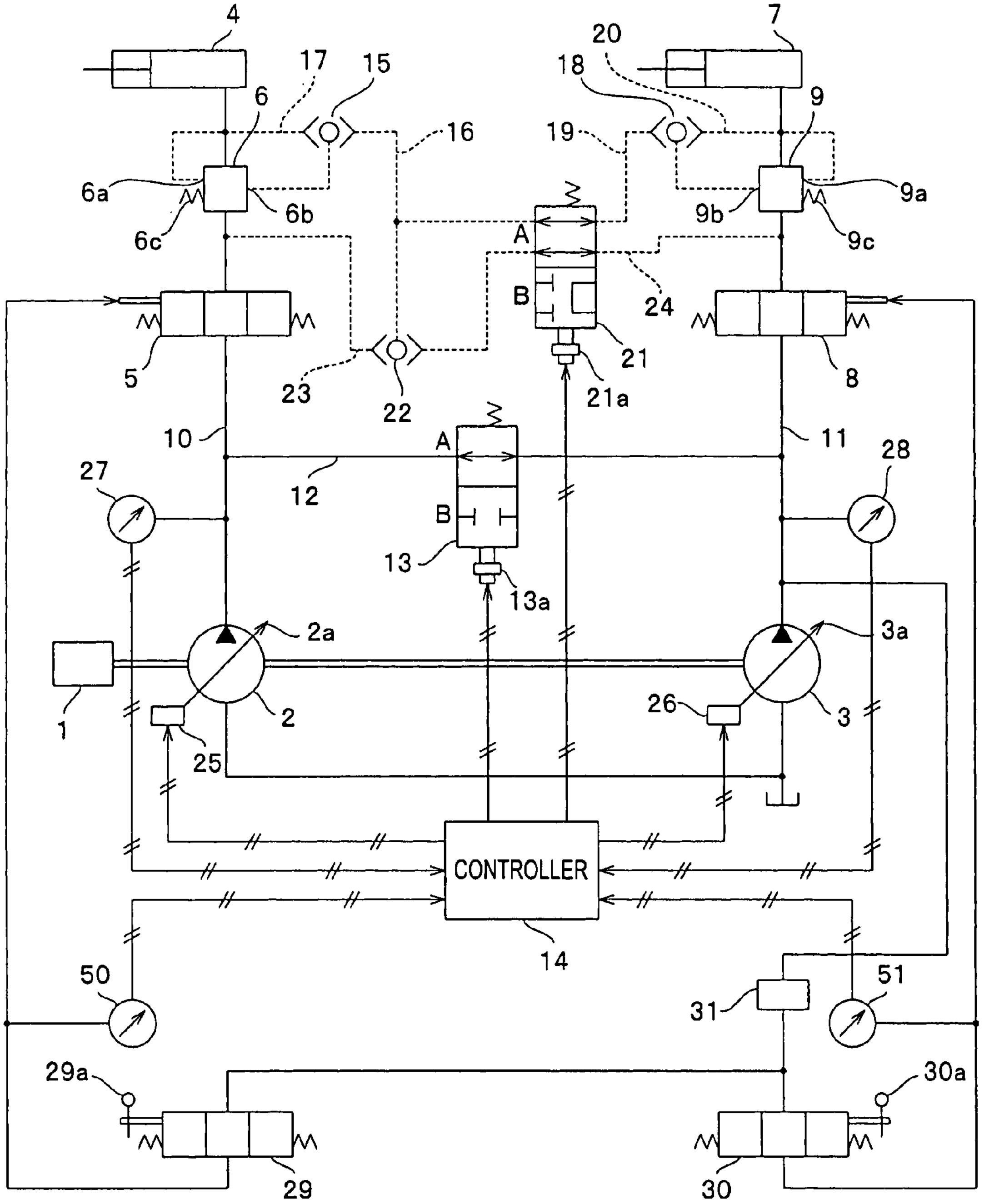
FIG. 1 is a circuit diagram of a hydraulic merging/diverging switching control device according to a first embodiment of the present invention.

1 engine
2, 3 first and second (variable capacity type) hydraulic pump
4, 7 first and second actuator
5, 8 first and second pilot-controlled directional control valve
6, 9 first and second pressure compensation valve
10, 11 first and second discharge oil path
12 connecting oil path
13 main merging/diverging valve
13*a*, 21*a* solenoid
14 controller (control means)
15, 18, 22 shuttle valve
21 auxiliary merging/diverging valve
19, 23, 24 load pressure introduction oil path
25, 26 servo mechanism
27, 28 (first and second) pressure sensor
29, 30 (first and second) working equipment operating switch valve
29*a*, 30*a* (first and second) operating lever for corresponding works
31 automatic pressure reduction valve
33 electromagnetic directional control valve
34 pressure reduction valve
35 proportional valve (electromagnetic proportional valve) or diaphragm
36 bypass oil path
37 pressure compensation valve (check valve) with checking function
38 flow rate control valve for operating arm at high speed
41 (lever) operating condition judging section
42 operation pattern storage section
43 pattern collating section
44 discharge pressure storage section
46 command signal determination section
47 command signal output section
50, 51 (first and second) pilot pressure sensor
106 first pressure compensation valve with checking function
109 second pressure compensation valve with checking function

BEST MODE FOR CARRYING OUT THE INVENTION

Now, according to the invention, representative embodiments of a hydraulic control device for a hydraulic excavator will be described in detail with reference to attached drawings.

FIG. 1 is a diagram showing an example of the circuit configuration of the hydraulic control device. The hydraulic control device according to the first embodiment includes a first variable capacity type hydraulic pump (hereinafter referred to as "first hydraulic pump") 2 that is driven by an engine 1, and a second variable capacity type hydraulic pump (hereinafter referred to as "second hydraulic pump") 3 that also is driven by the engine 1.

Pressure oil discharged from the first hydraulic pump 2 is supplied to a first actuator 4, and the first actuator 4 is driven by the pressure oil. Interposed between the first hydraulic pump 2 and the first actuator 4 are a first pilot-controlled directional control valve 5 and a first pressure compensation valve 6. While controlling the flow rate of pressure oil supplied to the first actuator 4, the first pilot-controlled directional control valve 5 switches the direction of the pressure oil feed. The first pressure compensation valve 6 compensates for a difference between pressures before and after the first pilot-controlled directional control valve 5 so that the difference between the pressures has a predetermined value. On the other hand, pressure oil discharged from the second hydraulic pump 3 is supplied to a second actuator 7, and the second actuator 7 is driven by the pressure oil. Interposed between the second hydraulic pump 3 and the second actuator 7 are a second pilot-controlled directional control valve 8 and a second pressure compensation valve 9. While controlling the flow rate of pressure oil supplied to the second actuator 7, the second pilot-controlled directional control valve 8 switches the direction of the pressure oil feed. The second pressure compensation valve 9 compensates for a difference between pressures before and after the second pilot-controlled directional control valve 8 so that the difference between the pressures has a predetermined value. These pilot-controlled directional control valves 5 and 8 function as directional control valves that not only adjust the flow rates of pressure oils supplied to the first actuator 4 and second actuator 7 of the present invention but also switch the direction of the pressure oil flows.

In the example shown in FIG. 1, only the single first actuator 4 is connected to the first hydraulic pump 2 and only the single second actuator 7 is connected to the second hydraulic pump 3. However, in addition to the first and second actuators 4 and 7, other actuators (not shown) are also connected to the hydraulic pumps 2 and 3 via similar control oil paths extending parallel to one another. In addition, the first and second pilot-controlled directional control valves 5 and 8 actuated by pilot pressure serve as valves that control the flow rate and direction of the operating pressure oils for the first and second actuators 4 and 7. However, they may also be replaced with ordinary operating switch valves. In such a case, a lever stroke sensor may be used as an operating-condition judging means. Nonetheless, pilot-controlled directional control valves 5 and 8 as in the present embodiment ensure finer control in a variety of operating conditions.

In the present invention, disposed in a first discharge oil path 10 and a second discharge oil path 11 are a first pressure sensor 27 and a second pressure sensor 28 respectively, which detect the discharge pressures of the first and second hydraulic pumps 2 and 3 respectively. Pilot pressures that actuate the corresponding first and second pilot-controlled directional control valves 5 and 8 are supplied by operating the operating levers 29*a* and 30*a* for corresponding works of the first and second working equipment operating switch valves 29 and 30 connected via the second discharge oil path 11 and an automatic pressure reduction valve 31, which are disposed upstream of the second pressure sensor 28. The first and second pilot-controlled directional control valves 5 and 8 detect input oil pressures by means of pilot pressure sensors 50 and 51 respectively and send the results to a controller 14, where the detected oil pressures are digitized. Specifically, if the pilot pressure of either of the first and second pilot-controlled directional control valves 5 and 8 detected by the pilot pressure sensors 50 and 51 has reached the predetermined upper limit of an operating pressure range, the controller 14 determines that the signal is ON. If all the pilot pressures have dropped to the predetermined lower limit or below, the controller 14 determines that the signal is OFF.

Figure 2:
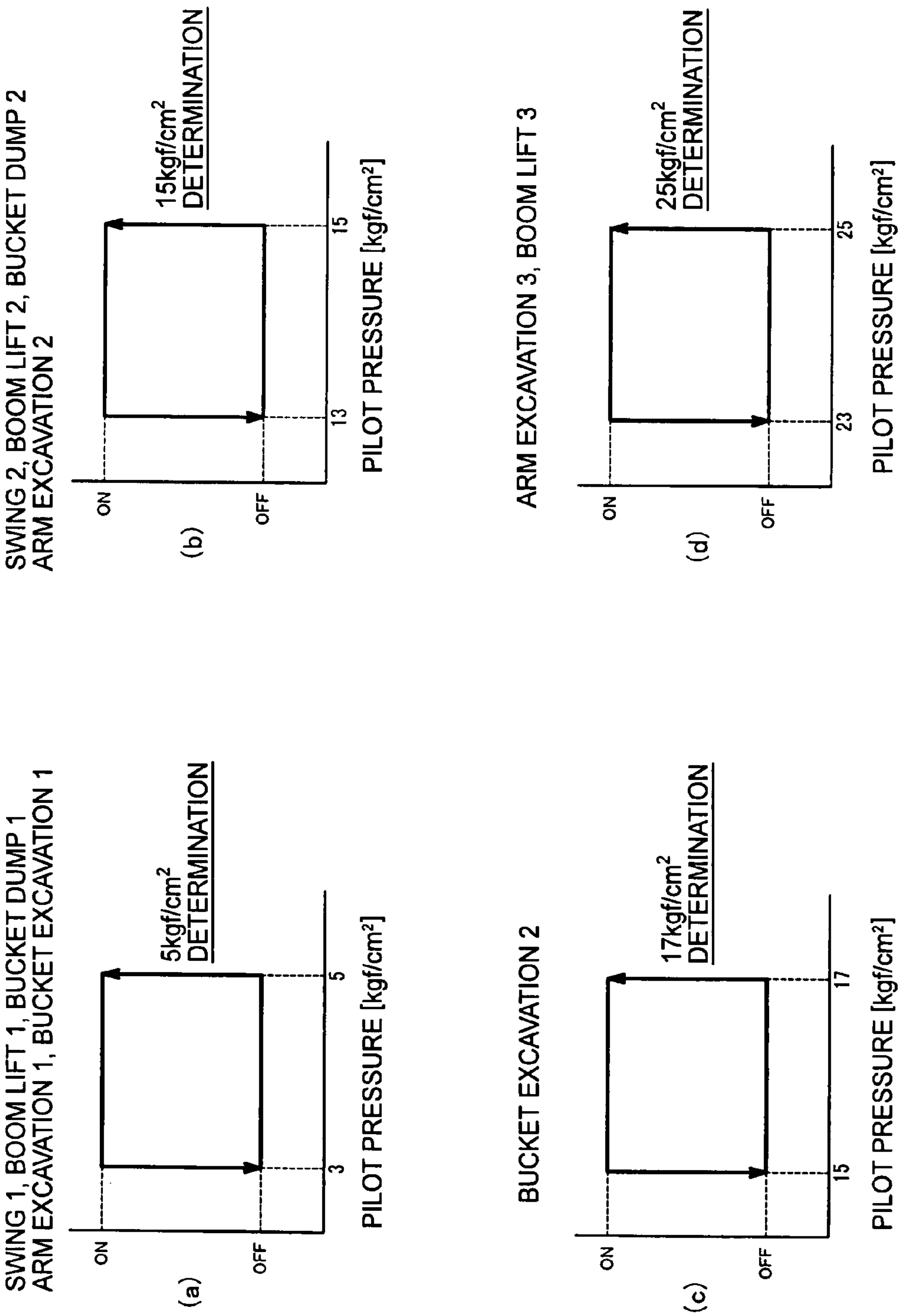
FIG. 2 is a view illustrating determination patterns for the operating conditions of a plurality of working equipments according to the first embodiment.

It should be noted that each actuator has not one set pressure range from the upper limit to the lower limit of the pilot pressure, but one to three set pressure ranges. This is because the hydraulic pump must be actuated most efficiently in all operating conditions, taking account of the type of work and load pressure corresponding to each actuator. For example, in the first embodiment, the actuator for the swing body of the hydraulic excavator has two pressure ranges, as shown in FIG. 2, such that even if the actuator is independently operated, an ON signal results when the pilot pressure reaches 5 $kgf/cm^2$ or 15 $kgf/cm^2$ and, if other actuators are not actuated, an OFF signal results when the pilot pressure reaches 3 $kgf/cm^2$ or 13 $kgf/cm^2$. Two pressure ranges (pilot pressure: 15 to 17 $kgf/cm^2$) have been set for the actuator assigned to bucket excavation, and three pressure ranges have been set for the actuator assigned to boom lift and arm excavation. The first and second pilot-controlled directional control valves according to the first embodiment are attached to six axes of the working equipment, which are provided for left and right swings, boom lift, bucket dump, arm excavation, and bucket excavation.

In the first embodiment, the discharge oil path 10 of the first hydraulic pump 2 (hereinafter referred to as "first discharge oil path") and the discharge oil path 11 of the second hydraulic pump 3 (hereinafter referred to as "second discharge oil path") are connected by a connecting oil path (i.e., merging line) 12. Interposed in the connecting oil path 12 is a main merging/diverging valve 13 of an electromagnetic proportional type. The main merging/diverging valve 13 has a solenoid 13*a*. In response to a control signal supplied from the controller 14 to the solenoid 13*a*, switching takes place between the merging position A where the first discharge oil path 10 and second discharge oil path 11 are connected and the diverging position B where the discharge oil paths 10 and 11 are disconnected.

The first pressure compensation valve 6 includes: a first pressure-receiving part 6*a* supplied with the exit-side pressure (i.e. actuator holding pressure) of the first pressure compensation valve 6; a second pressure-receiving part 6*b* connected to a load pressure introduction oil path 16 and holding-pressure introduction oil path 17 via a shuttle valve 15, and supplied with the higher of the oil pressures of the oil paths 16 and 17; and a spring 6*c* disposed on the first pressure-receiving part 6*a* side. Similarly, The second pressure compensation valve 9 includes: a first pressure-receiving part 9*a* supplied with the exit-side pressure (i.e. actuator holding pressure) of the second pressure compensation valve 9; a second pressure-receiving part 9*b* connected to a load pressure introduction oil path 19 and holding-pressure introduction oil path 20 via a shuttle valve 18, and supplied with the higher of the oil pressures of the oil path 19 and 20; and a spring 9*c* disposed on the first pressure-receiving part 9*a* side.

The load pressure introduction oil path 19 is connected to the load pressure introduction oil path 16 via an auxiliary merging/diverging valve 21 of an electromagnetic proportional type, and is also connected, via a shuttle valve 22, to a load pressure introduction oil path 23 extending from the exit of the first pilot-controlled directional control valve 5 and a load pressure introduction oil path 24 extending from the exit of the second pilot-controlled directional control valve 8. The load pressure introduction oil path 19 supplies the shuttle valve 15 and 18 with the higher of the load pressures supplied by the first actuator 4 and second actuator 7. The auxiliary merging/diverging valve 21 is interposed in the load pressure introduction oil path 24.

The auxiliary merging/diverging valve 21 has a solenoid 21*a*. In response to a control signal supplied to the solenoid 21*a* from the controller 14, the valve 21 switches between the merging position A where the load pressure introduction oil path 16 and the load pressure introduction oil path 19 are connected and the load pressure introduction oil path 24 and the shuttle valve 22 are connected and the diverging position B where they are disconnected from each other. The controller 14 outputs control signals to the solenoids 13*a* and 21*a* of the main merging/diverging valve 13 and auxiliary merging/diverging valve 21 respectively. The controller 14 also outputs control signals to servomechanisms 25 and 26, which drive the swash plates 2*a* and 3*a* of the first hydraulic pump 2 and second hydraulic pump 3 respectively.

Analog signals indicating pilot pressures for operating the first and second pilot-controlled directional control valve 5 and 8 are supplied to the controller 14 from the first and second pilot pressure sensors 50 and 51. Thereby, as described above, the controller 14 is kept apprised of the operating conditions of the operating levers 29*a* and 30*a* for corresponding works. The analog signals are digitized by the controller 14. At this time, any change in the discharge pressure of the first hydraulic pump 2 and/or any change in the discharge pressure of the second hydraulic pump 3 are detected by the first pressure sensor 27 attached to the first discharge oil path 10 and second pressure sensor 28 attached to the second discharge oil path 11, respectively. The present invention found that changes in the discharge pressures of the first hydraulic pump 2 and second hydraulic pump 3 detected by the first pressure sensor 27 and second pressure sensor 28 respectively correlate with changes in the load pressures of the first actuator 4 and the second actuator 7. This makes it possible to estimate that when the discharge pressures of the first and second hydraulic pumps 2 and 3 have increased, the load pressures of the first and second actuators 4 and 7 have also increased.

Figure 3:
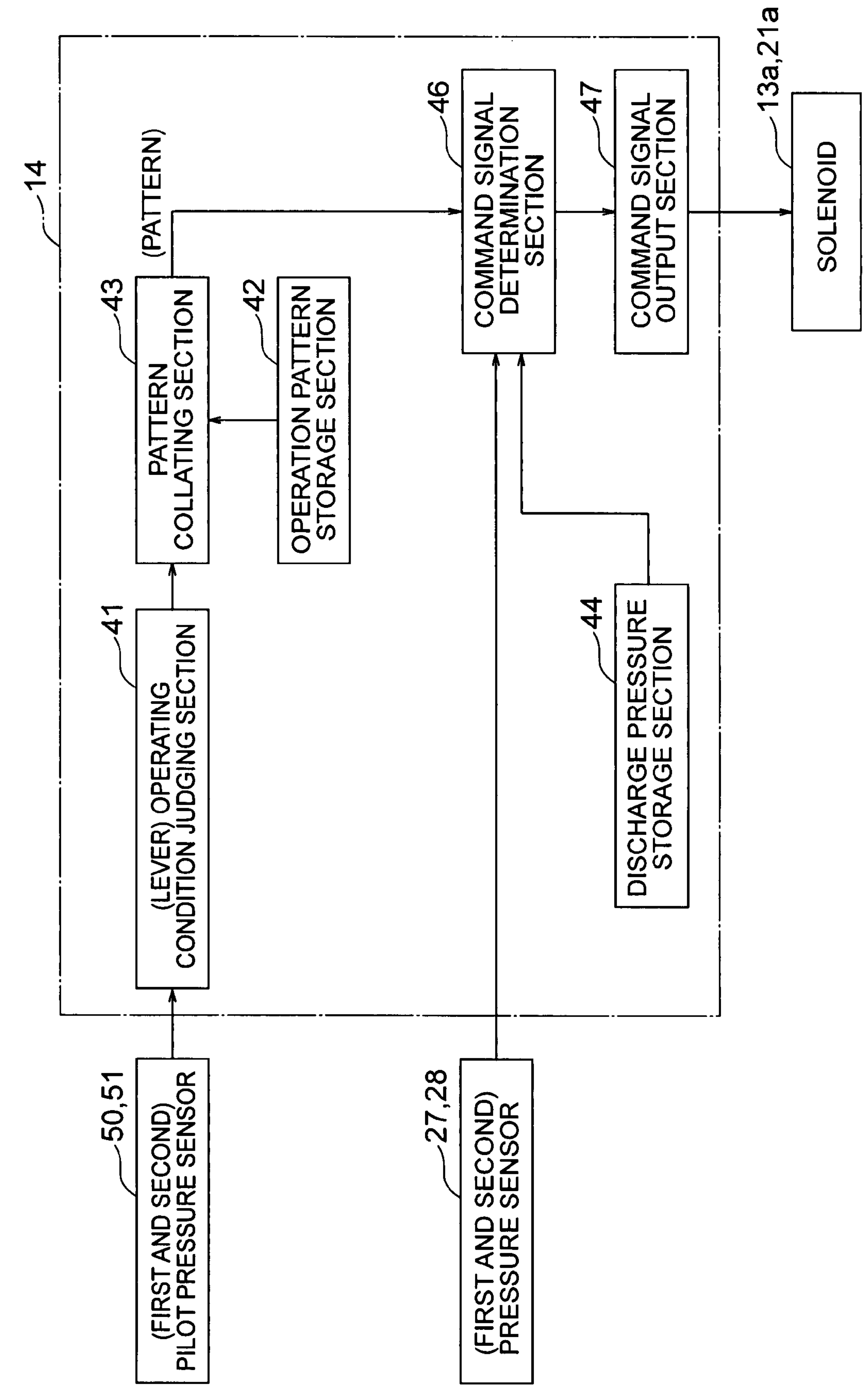
FIG. 3 is a block diagram illustrating control by a controller according to the first embodiment.

As shown in FIG. 3, the controller 14 includes: an operating condition judging section 41 that receives signals from the first and second pilot-controlled directional control valves 5 and 8 actuated according to various operating degrees of the first and second operating levers 29*a* and 30*a* for corresponding work equipments, thereby judging the operating condition; an operation pattern storage section 42 storing operation patterns, as shown in FIG. 4, formed in advance for the corresponding actuators; a pattern collating section 43 that determines which one of the operation patterns stored in the storage section 42 matches the operating condition judged by the operating condition judging section 41; a discharge pressure storage section 44 storing information about discharge pressure set in advance for the matching operation pattern obtained as a result of the collation; a command signal determination section 46 that compares the actual discharge pressures, detected by the first and second pressure sensors 27 and 28 serving as discharge pressure detecting means provided for the first and second hydraulic pumps 2 and 3, with corresponding set discharge pressures stored in the discharge pressure storage section 44, and then switches the main merging/diverging valve 13 to the diverging side when the actual discharge pressures are higher than the set discharge pressures, or switches the main merging/diverging valve 13 to the merging side when the actual discharge pressures are lower than the set discharge pressures; and a command signal output section 47 that outputs command signals to the solenoids 13*a* and 21*a* in accordance with the determination made by the command signal determination section 46.

Figure 5:
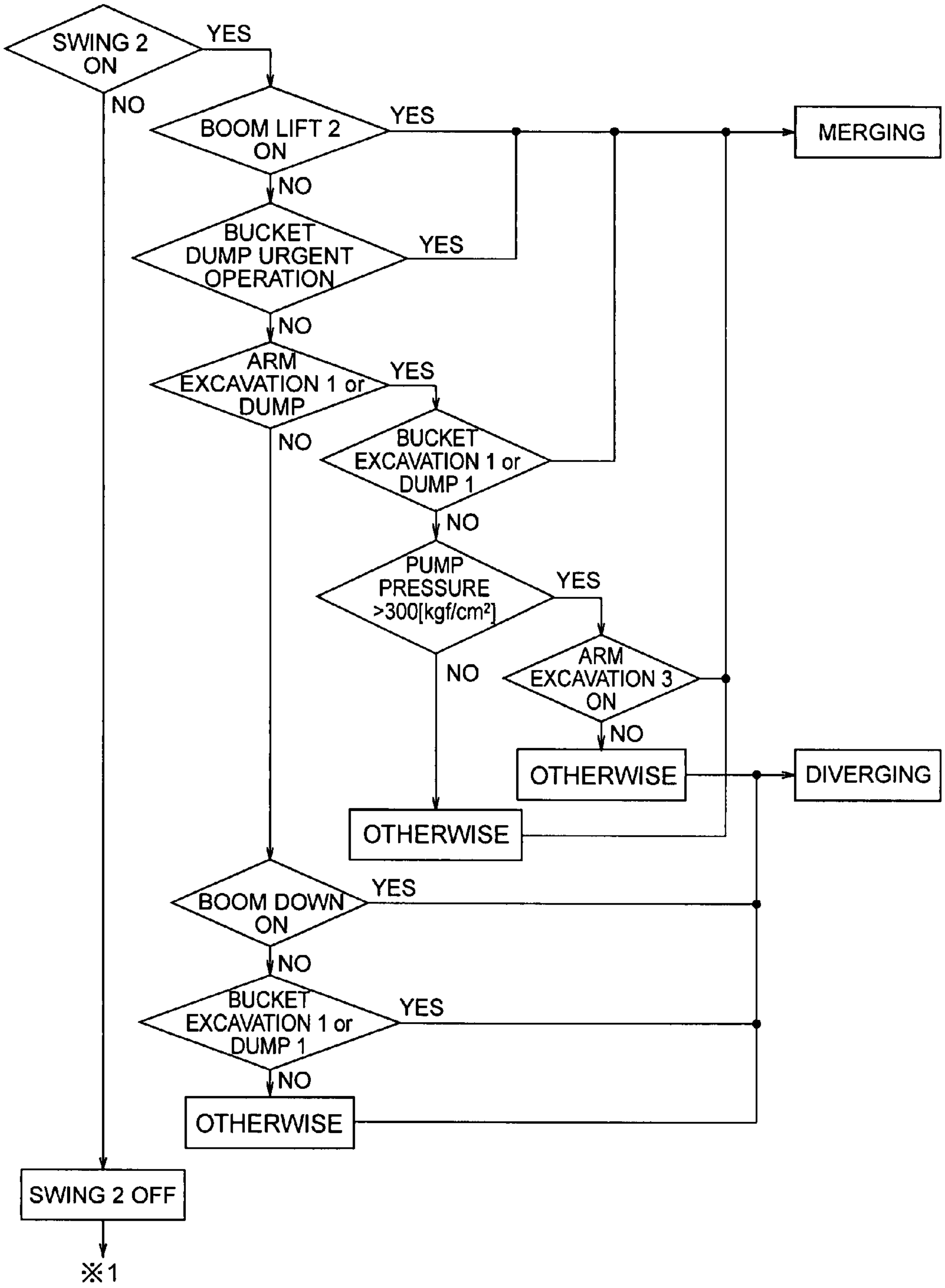
FIG. 5 is part of a flowchart illustrating an operation procedure for merging/diverging control according to the first embodiment.
Figure 6:
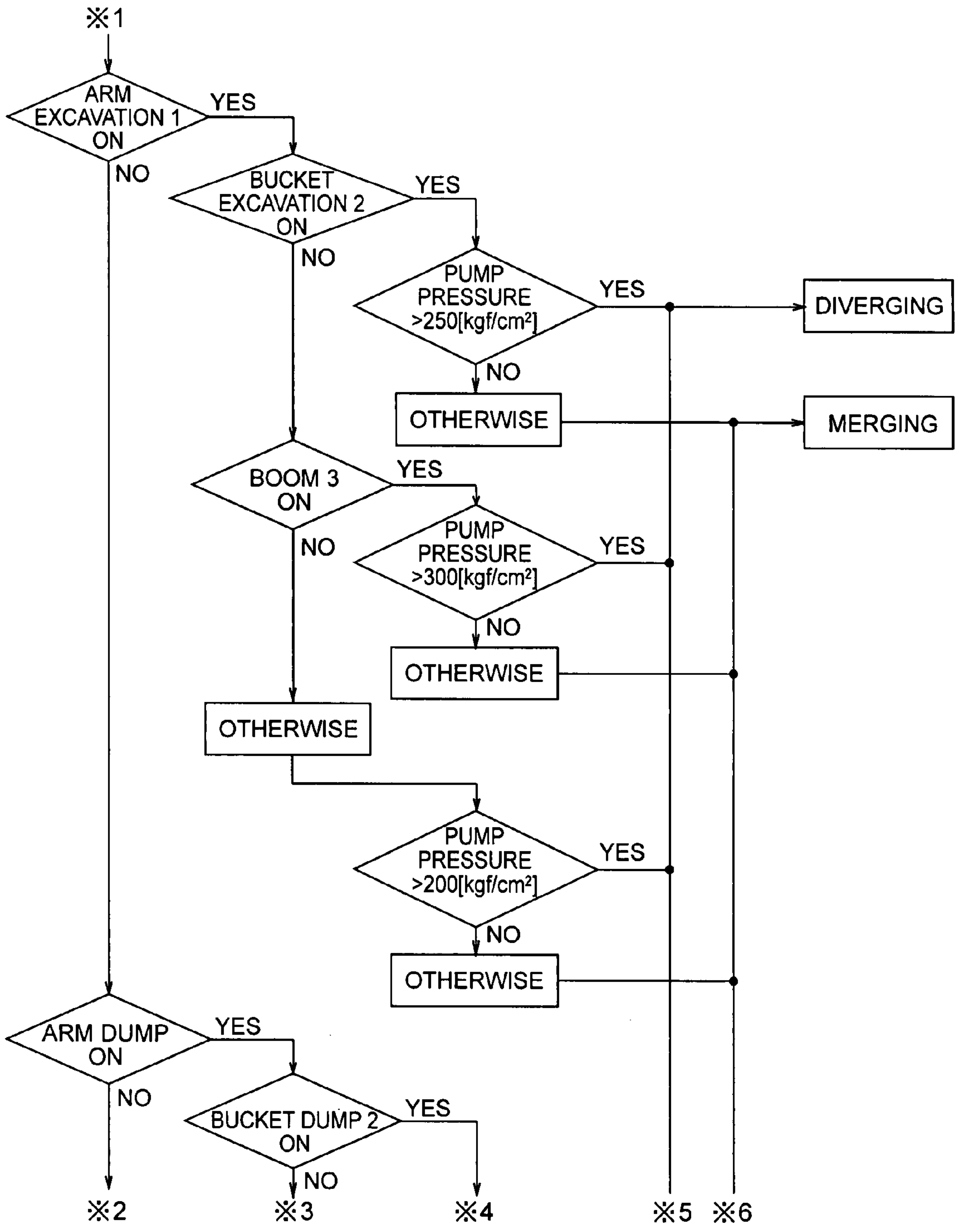
FIG. 6 is a subsequent part of the flowchart shown in FIG. 5.
Figure 7:
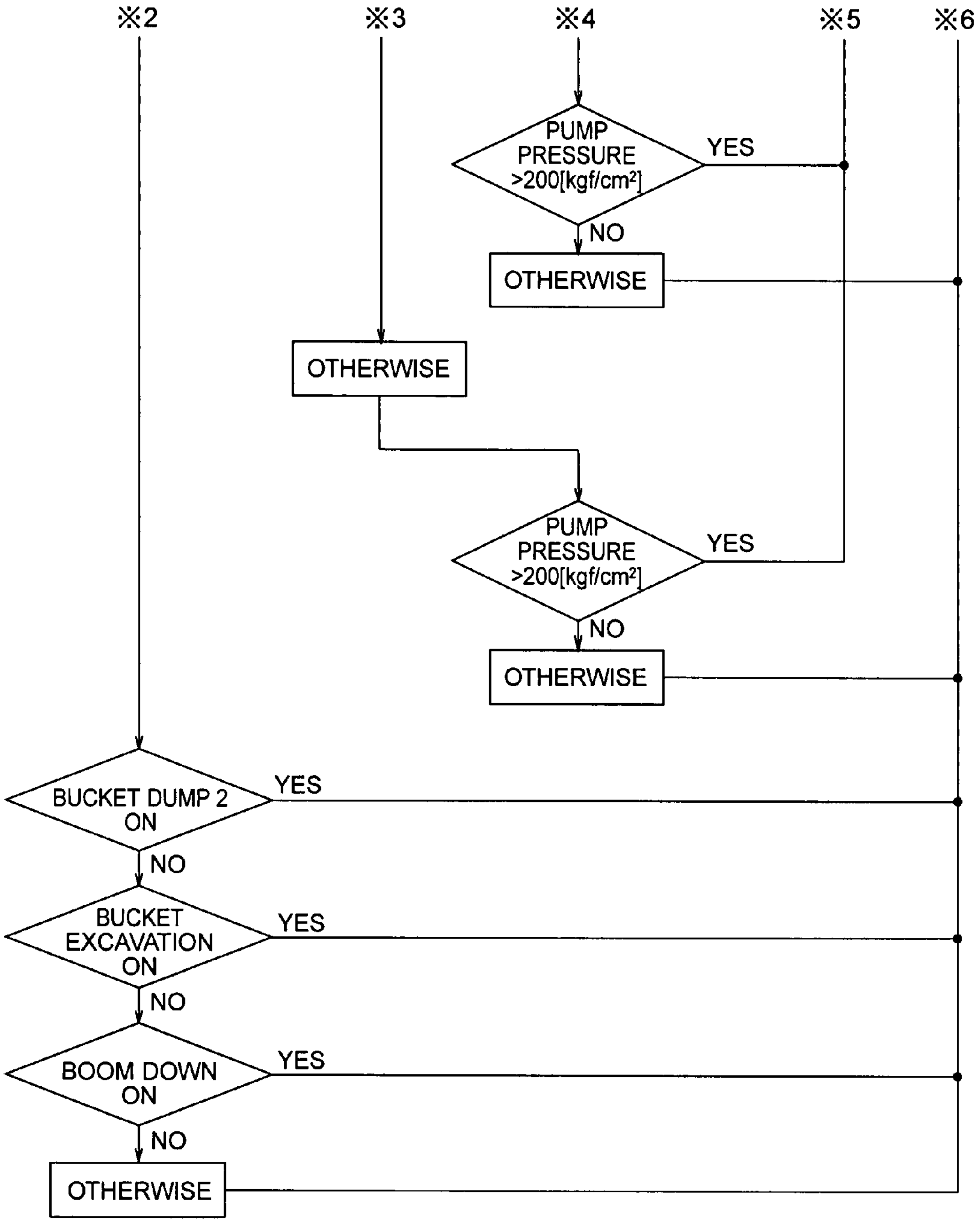
FIG. 7 is a further subsequent part of the flowchart shown in FIG. 5.

FIG. 4 shows examples of the operation pattern stored in the operation pattern storage section according to the first embodiment. FIG. 5 to 7 shows flowcharts illustrating an operation procedure for switching control of a main merging/diverging valve 13 based on the same operation pattern.

In FIG. 4, there are seventeen operation patterns, from No. 1 No No. 17, and four actuators to be controlled: (1) swing actuator, (2) boom lift actuator, (3) arm excavation or dumping actuator, (4) bucket excavation or dumping actuator. As shown in FIG. 2, in terms of the range of the set pressure of each of the first and second pilot-controlled directional control valves 5 and 8, two thresholds are set for the swing actuator, three for the boom lift actuator, three for the arm excavation actuator, three for the arm excavation actuator, two for the bucket excavation actuator, and two for the bucket dumping actuator.

Referring to charts in FIGS. 5 to 7, representative switching control procedures for the main merging/diverging valve 13 based on the operation patterns shown in FIG. 4 will now be explained in detail. Descriptions given below are for a specific example where a swing operation for the swing body and an operation for arm excavation are performed simultaneously and a specific example where an operation for arm excavation and an operation for bucket excavation are performed simultaneously. However, the merging/diverging control of a compound operation consisting of a combination of operations by other working equipments is exerted in a similar manner exemplified below.

In the operation pattern No. 1, only the swing actuator is actuated and the other actuators are not actuated. Normally, low speed suffices to swing the swing body, and an extremely high load pressure is not required as long as there are no obstacles. Accordingly, one hydraulic pump can be smoothly operated alone without the aid of the other hydraulic pump. Therefore, regardless of the operating degree of the swing operating lever, both the main merging/diverging valve 13 and the auxiliary merging/diverging valve 21 are in the respective diverging positions B.

For example, in the case where the operation for the swing body and the operation for arm excavation are simultaneously carried out, as in the operation pattern No. 3, when the main and auxiliary merging/diverging valves 13 and 21 are in the respective merging positions A, operation of operating levers 29*a* and 30*a* for the corresponding works is initiated. In this case, the upper limits of the pilot pressures of the pilot-controlled directional control valves 5 and 8, which have been output according to the operating degree of the operating levers 29*a* and 30*a* for the corresponding works, are within, for example, 15 kgf/cm$^2$, as shown in FIG. 2 (*b*), and a pattern collating section incorporated in the controller 14 checks the operation pattern matching the degree (i.e., condition) of operation against various operation patterns, as shown in FIG. 4, stored in the operation pattern storage section 41. If an operation pattern that matches the operating degree is found and, in addition, the maximum discharge pressures of the first and second hydraulic pumps 2 and 3 detected by the first and second pressure sensors 27 and 28 respectively are higher than 300 kgf/cm$^2$, it is determined that the pressures are high. Consequently, the main merging/diverging valve 13 is switched, to the diverging position B, and also the auxiliary merging/diverging valve 21 is switched from the merging position A to the diverging position B after adjustment of the discharge flow rates of the first and second hydraulic pumps 2 and 3.

For example, as shown in flowcharts in FIGS. 5 to 7, in order to simultaneously perform arm excavation and bucket excavation without involving a swing operation, an arm operating lever and a bucket operating lever are simultaneously operated in an operating condition within the corresponding pilot pressure ranges shown in FIGS. 2A and 2C while the main merging/diverging valve 13 and auxiliary merging/diverging valve 21 are kept in their respective merging positions A. Signals corresponding to this operating condition are converted into binary numbers by the corresponding pilot-controlled directional control valves and the results are sent to the controller 14. In the controller 14, the operating condition judging section 41 judges the current operating condition, and the pattern collating section 43 finds in the operation pattern storage section 42 (not shown) the operation pattern Nos. 15 and 16 (see FIG. 4) that match the result of the judgment. In addition, the pattern collating section 43 compares the set discharge pressure 250 kgf/$cm^2$ read from the discharge pressure storage section 44, with the maximum values of the discharge pressures of the first and second pumps sent by the pressure sensors 27 and 28. If the maximum values of the actual discharge pressures are higher than 250 kgf/$cm^2$, the command signal determination section 46 determines that the pressures are high. Consequently, the command signal determination section 46 switches the main merging/diverging valve 13 to the diverging position B from the merging position A, and then switches the auxiliary merging/diverging valve 21 to the diverging position B from the merging position A after the discharge flow rates of the first and second hydraulic pumps 2 and 3 are adjusted. On the other hand, if the total of the actual discharge pressures is lower than 250 kgf/$cm^2$ as a result of the comparison between the set discharge pressure and the maximum values of the actual discharge pressures sent from the pressure sensors 27 and 28, the command signal determination section 46 estimates that load pressures on the arm actuator and bucket actuator are low, and then keeps the main and auxiliary merging/diverging valves 13 and 21 in their respective merging positions A without switching them.

In this invention, as is understood from the forgoing examples, information about the operating condition of each operating lever is sent to the controller 14 and digitized, and the pattern collating section 43 checks the actual operation pattern against the various operation patterns appropriate to the operating condition and selects a matching operation pattern or patterns. In addition, the discharge pressures of the first hydraulic pump 2 and second hydraulic pump 3 are detected by the first pressure sensor 27 and the second pressure sensor 28 respectively, and the detection signals are transmitted to the controller 14. Based on the operation pattern matching the actual operation pattern, which has been selected by the pattern collating section 43 from many operation patterns stored in the operation pattern storage section 42, the controller 14 compares the preset discharge pressure and the maximum value of the actual discharge pressure. If the actual discharge pressure is higher than the set discharge pressure, the controller 14 switches the main merging/diverging valve and auxiliary merging/diverging valve to their respective diverging positions B. If the actual discharge pressure is lower than the set discharge pressure, the controller 14 switches the main and auxiliary merging/diverging valves 13 and 21 to their respective merging positions A or keeps them in the merging positions A. This eliminates the need for additional calculation and makes for control programs simpler than the control programs disclosed in the Patent document 1 described above. In addition, the determination whether to connect or disconnect the first and second discharge oil paths 10 and 11 depends upon the operation patterns and is, therefore, easier. Furthermore, the main and auxiliary merging/diverging valves can be accurately and smoothly switched without causing shock.

Next, the switching operations of the main merging/diverging valve 13 and auxiliary merging/diverging valve 21 will be described in detail with reference to FIGS. 1 and 6.

When the main and auxiliary merging/diverging valves 13 and 21 are in their respective merging positions A as shown in FIG. 1, the discharge pressure oils of the first hydraulic pump 2 and the second hydraulic pump 3 merge together via the main merging/diverging valve 13 and the single pressure oil thus obtained is supplied to the first actuator 4 and second actuator 7 simultaneously. At this time, the shuttle valve 22 selects the higher of the load pressures of the actuators 4 and 7, and the selected load pressure is supplied to one of the entrances of each of the shuttle valves 15 and 18. Thus, the first pressure compensation valve 6 and second pressure compensation valve 9 are set by the highest load pressure of the actuators 4 and 7, and the flow is distributed to the actuators 4 and 7 according to the ratio of the area of the opening of the first pilot-controlled directional control valve 5 to that of the second pilot-controlled directional control valve 8 even if the load pressures of the actuators 4 and 7 are different.

Figure 8:
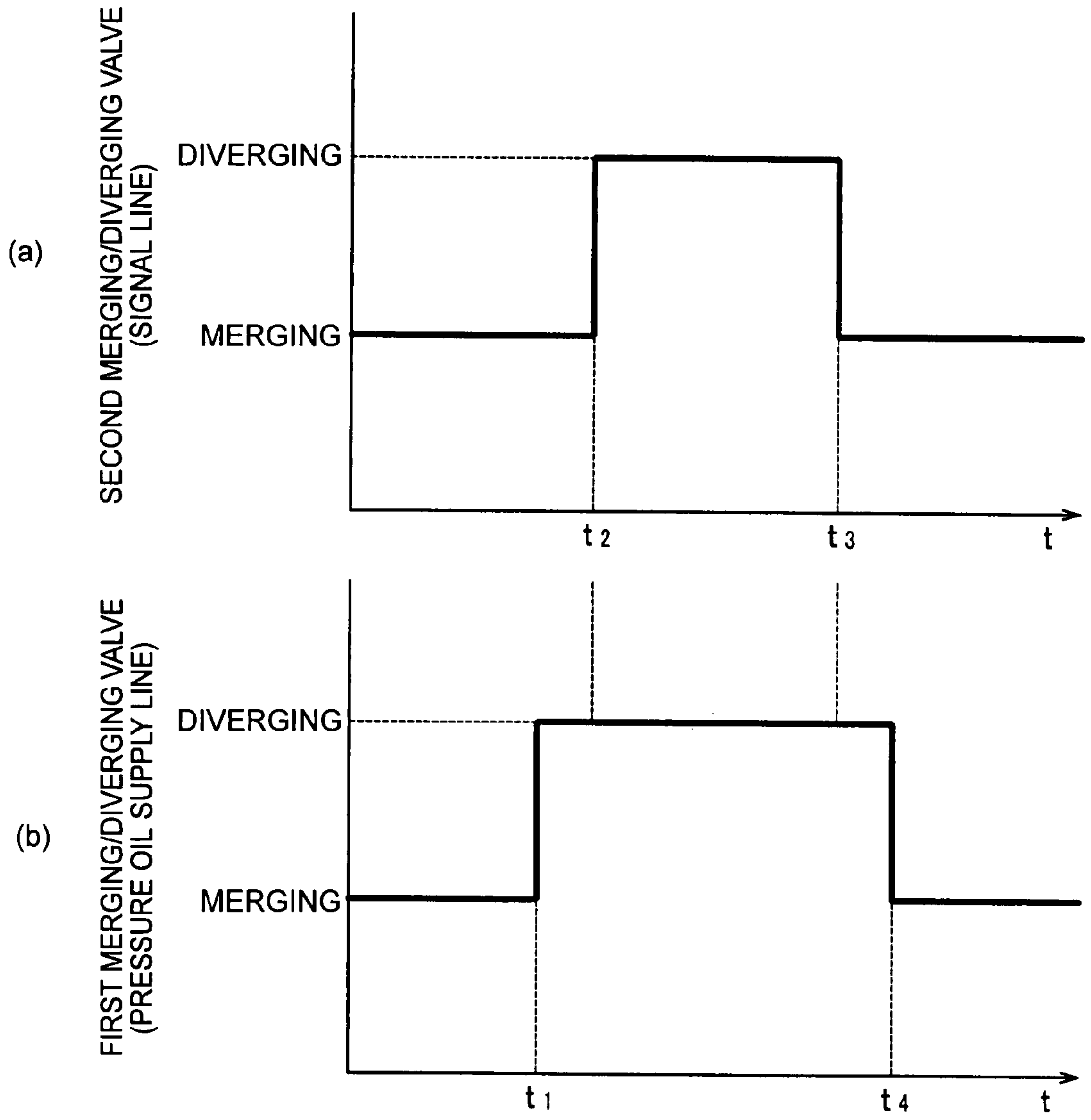
FIG. 8 is a time chart illustrating the timings of the merging/diverging control.

During work in conditions where the main and auxiliary merging/diverging valves 13 and 21 are in their respective merging positions A, merging/diverging control is exerted as described below. In this case, as described above, whether the load pressures of the first actuator 4 and second actuator 7 are high or not is estimated from the discharge pressures of the hydraulic pumps 2 and 3 respectively. First, taking account of the operating condition of each of the operating levers 29*a* and 30*a* for corresponding works, the valves 13 and 21 are switched from their respective merging positions to the diverging positions in order to avoid loss by pressure compensation in the merging state when the maximum values of the discharge pressures exceed the set pressure. Accordingly, in response to a command signal from the controller 14, the operation of switching the main merging/diverging valve 13 from the position A to the position B starts at time t1, as shown in FIG. 8(*b*). In FIG. 8, switching from a merging position to a diverging position is indicated by a line segment extending upward as in a step. However, actual switching is performed following a required modulation curve.

The discharge pressure of the first hydraulic pump 2 is detected by the pressure sensor 27, and the discharge pressure of the second hydraulic pump 3 is detected by the pressure sensor 28. Based on the detection data, the discharge pressures of both the hydraulic pumps 2 and 3 are measured. If the maximum values of the discharge pressures of the first hydraulic pumps 2 and second hydraulic pump 3 are higher than the set pressure, control signals are transmitted to the servomechanisms 25 and 26 respectively. Consequently, the swash plate 2*a* of the first hydraulic pump 2 and the swash plate 3*a* of the second hydraulic pump 3 are driven, and control is exerted to decrease the flow rate of the first hydraulic pump 2 and increase that of the second hydraulic pump 3. In this case, the swash plates 2*a* and 3*a* are controlled by the servomechanisms 25 and 26 respectively such that the switching operations of the main merging/diverging valve 13 are performed following the above-mentioned modulation curve. Also, the swash plates are controlled so as ultimately to match the flow rate obtained after the switching of the main merging/diverging valve 13. In other words, the hydraulic control device gradually changes the swash plate angles while detecting a flow rate change caused by the difference between the pressures of the connection oil path 12 before and after the main merging/diverging valve 13, thereby preventing a flow rate change during switching of the main merging/diverging valve 13.

Subsequently, after switching of the main merging/diverging valve 13 is completed, the auxiliary merging/diverging valve 21 is switched from the merging position A to the diverging position B at time t2, as shown in FIG. 8(*a*), in response to a command signal from the controller 14. The switching of the auxiliary merging/diverging valve 21 is also subject to a required modulation in the same manner as the main merging/diverging valve 13. After the switching of the main and auxiliary merging/diverging valves 13 and 21 to the diverging position B are thus finished, the discharge pressure oil of the first hydraulic pump 2 and the discharge pressure oil of the second hydraulic pump 3 are separately supplied to the first actuator 4 and second actuator 7 respectively. Accordingly, the respective set pressures of the first pressure compensation valve 6 and the second pressure compensation valve 9 can be independently determined for the corresponding hydraulic circuits according to the corresponding highest load pressures.

Thereafter, if the highest values of the discharge pressures of the first and second hydraulic pumps 2 and 3 decrease to below the set pressure in the above-described diverging state, the auxiliary merging/diverging valve 21 is switched from the diverging position B to the merging position A at time t3, as shown in FIG. 8(*a*), in response to a command signal from the controller 14 while subject to a required modulation. Thus, the respective pressure compensation valves 6 and 9 compensate for the pressure.

Subsequently, after switching of the auxiliary merging/diverging valve 21 is completed, the main merging/diverging valve 13 is switched from the diverging position B to the merging position at time t4, as shown in FIG. 8(*b*). This switching operation is performed gradually, and the discharge oils of the first hydraulic pump 2 and second hydraulic pump 3 merge together via the main merging/diverging valve 13 when the switching operation has finished.

According to the hydraulic control device of this embodiment, the operating condition (operating degree) of each of various operating levers in the merging state is taken into account. If the maximum value of the discharge pressure obtained in a single back-and-forth action of the first hydraulic pump 2 and that of the second hydraulic pump 3 exceed the preset discharge pressure, it is estimated that the maximum values of the load pressures of the first actuator 4 and the second actuator 7 must also have increased. Accordingly, the hydraulic control device switches the main merging/diverging valve 13 from the merging position A to the diverging position B while making the predetermined modulation to the switching. During this modulation, the discharge flow rates of the first hydraulic pump 2 and the second hydraulic pump 3 are adjusted. After the adjustment, the hydraulic control device switches the auxiliary merging/diverging valve 21 from the merging position A to the diverging position B. On the other hand, if the respective required flow rates of the actuators 4 and 7 decrease in the diverging state such that the maximum values of the discharge pressures of the first hydraulic pump 2 and the second hydraulic pump 3 drop below the set pressure, the hydraulic control device first switches the auxiliary merging/diverging valve 21 from the diverging position B to the merging position A while making the predetermined modulation to the switching. During this modulation, the first pressure compensation valve 6 and second pressure compensation valve 9 compensate for the discharge pressure decreases. Thereafter, the hydraulic control device switches the main merging/diverging valve 13 from the diverging position B to the merging position A. Accordingly, even during work, smooth switching from a merging state to a diverging state and vice versa can be ensured without shock resulting from a change in the flow of pressure oil. In addition, the hydraulic control device exhibits such excellent qualities that even after switching from the merging state to the diverging state, the first and second hydraulic pumps 2 and 3 are independently controlled, diverging loss in the diverging state can be decreased, and an optimal flow distribution is constantly ensured both in merging and diverging.

Figure 9:
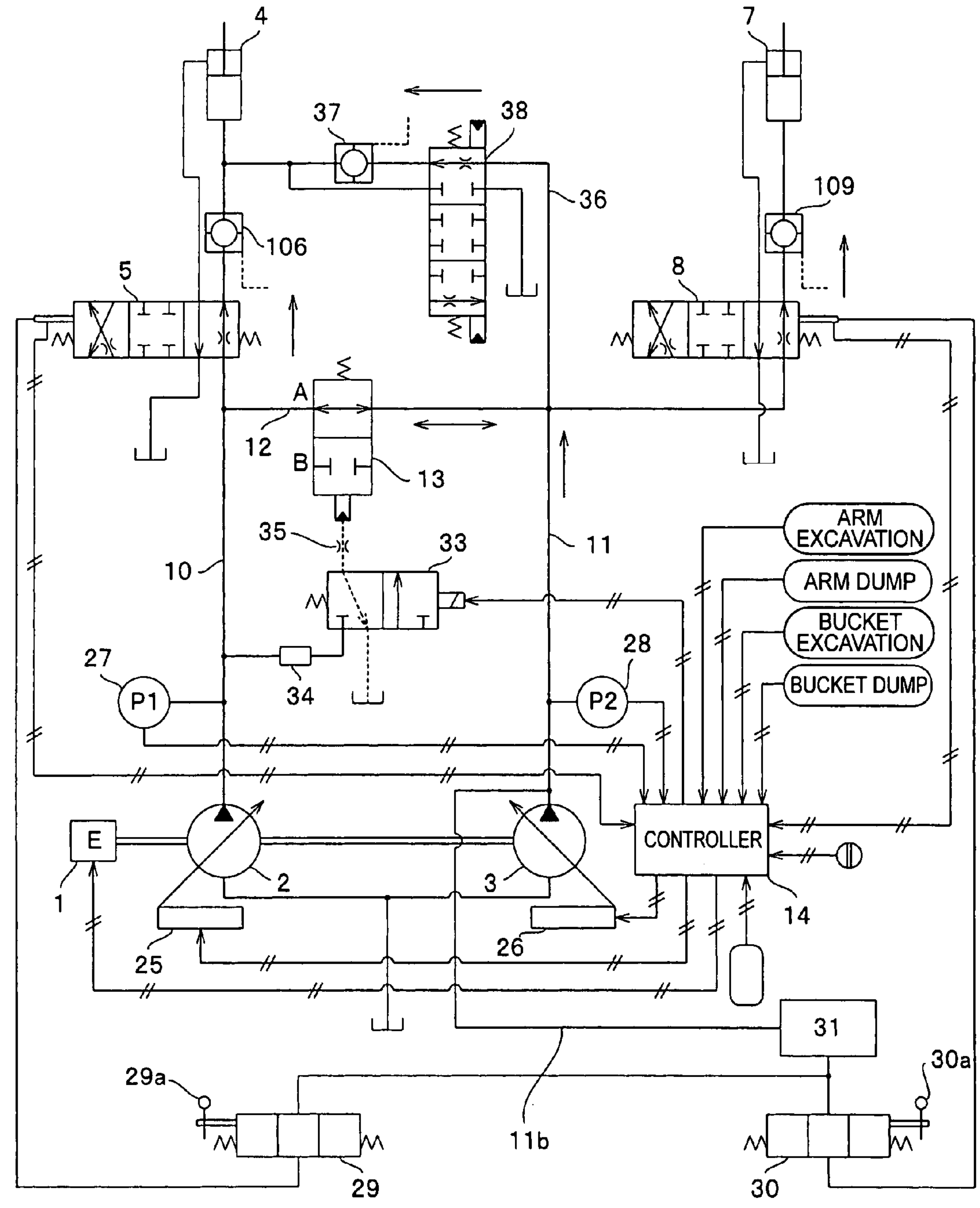
FIG. 9 is a circuit diagram of a hydraulic merging/diverging switching control device according to a second embodiment of the present invention.

FIG. 9 is a diagram showing a merging/diverging switching control circuit for the hydraulic pump of a hydraulic excavator according to the second embodiment of the present invention. The control circuit according to the second embodiment of the present invention is a modified example of the control circuit disclosed in the Patent document 1 described above. The function specific to the present invention is substantially identical to that of the first embodiment. Reference numerals identical to the first embodiment are used in the description of components or the like that are also identical to those in the first embodiment.

The control circuit according to the second embodiment greatly differs from the first embodiment in that only a main merging/diverging valve 13 is provided. As in the first embodiment, this control circuit includes a first discharge oil path 10 and a second discharge oil path 11. The discharge oil paths 10 and 11 have: a first hydraulic pump 2 and a second hydraulic pump 3 respectively, which are driven by an engine 1; a first actuator 4 and a second actuator 7 respectively, which are driven by corresponding pressure oils from the hydraulic pumps 2 and 3 respectively; and a first pilot-controlled directional control valve 5 and a second pilot-controlled directional control valve 8 respectively, which control the respective flow rates and directions of the pressure oils supplied to the corresponding actuators 4 and 7. In addition, the first and second discharge oil paths 10 and 11 are connected by a connecting oil path 12, in which the main merging/diverging valve 13 is interposed.

A first pressure compensation valve 106 with a checking function is interposed between the first pilot-controlled directional control valve 5 and the first actuator 4 of the discharge oil path 10. Similarly, a second pressure compensation valve 109 with a checking function is interposed between the second pilot-controlled directional control valve 8 and the second actuator 7 of the discharge oil path 11. First and second working equipment operating switch valves 29 and 30 for actuating the first and second actuators 4 and 7 respectively via an automatic pressure reduction valve 31 are connected to corresponding discharge oil paths 11*b* between the second hydraulic pump 3 and the pressure sensor 28. Pilot pressures corresponding to the respective operating degrees (i.e., operating stroke lengths) of the operating levers 29*a* and 30*a* are output to the first pilot-controlled directional control valve 5 and the second pilot-controlled directional control valve 8 respectively from the first and second working equipment operating switch valves 29 and 30 respectively.

Incidentally, the main merging/diverging valve 13 is controlled by a controller 14 such that a command signal from the controller 14 is input to an electromagnetic directional control valve 33, the electromagnetic directional control valve 33 consequently switches, and the main merging/diverging valve 13 thereby switches to a merging state or diverging state. Specifically, by altering the switching timing of the electromagnetic directional control valve 33, pressure setting for opening or closing the main merging/diverging valve 13 can be altered according to various conditions. In this case, the first discharge oil path 10 and the electromagnetic directional control valve 33 are connected by pilot piping via a pressure reduction valve 34. As a result, pressure oil from the first hydraulic pump 2 is supplied to the electromagnetic directional control valve 33 after being reduced in pressure by the pressure reduction valve 34. Additionally, a proportional valve (i.e., electromagnetic proportional valve) or a diaphragm 35 is disposed between the main merging/diverging valve 13 and the electromagnetic directional control valve 33, thereby actuating the main merging/diverging valve 13 gradually in order to reduce shock (i.e., impact) that may occur during switching of the main merging/diverging valve 13.

The second embodiment utilizes a bypass oil path 36, which bypasses the first and second discharge oil paths 10 and 11. Disposed in the bypass oil path 36 are: a pressure compensation valve (i.e., checking valve) 37 with a checking function, which allows a flow of pressure oil only in the direction of the first actuator 4 used for an arm; and a flow rate control valve 38 for operating the arm at high speed, which is synchronized with the first pilot-controlled directional control valve 5 so as to close the bypass oil path 36 when the first pilot-controlled directional control valve 5 is closed. To be specific, the bypass oil path 36 connects the point where the second discharge oil path 11 intersects the connecting oil path 12 to that section of the first discharge oil path 10 which is downstream of the first pressure compensation valve 106 with a checking function. As a flow rate control valve 38 for operating the arm at high speed, a flow rate/direction control valve similar to that for each of the first and second pilot-controlled directional control valves 5 and 8 is disposed upstream of the pressure compensation valve 37 with a checking function.

In this case, the first pilot-controlled directional control valve 5 and the flow rate control valve 38 for operating the arm at a high speed synchronize: when the first actuator 4 requires a high flow rate, both the first pilot-controlled directional control valve 5 and flow rate control valve 38 are opened such that the valve 5 is opened and the valve 38 is opened thereafter; after the requirement is met, the flow rate control valve 38 is closed and only the first pilot-controlled directional control valve 5 is kept open.

The first pressure compensation valve 106 with the checking function and the second pressure compensation valve 109 with the checking function normally allow a flow downstream and restrict a flow upstream, as indicated by the arrows. In other words, the first pressure compensation valve 106 with the checking function prevents pressure oil from flowing in the reverse direction from the first hydraulic pump 2 to the first actuator 4 used for the arm whereas the second pressure compensation valve 109 with the checking function prevents pressure oil from flowing in the reverse direction from the second hydraulic pump 3 to the second actuator 7 used for the bucket. The dispositions of the first and second pressure compensation valves 106 and 109 with checking function shown in FIG. 9 are identical to those assigned to arm and bucket excavation, respectively.

Next, a description is given of a hydraulic control device that has the forgoing configuration.

By operating first and second operating levers 29*a* and 30*a* for corresponding works when the main merging/diverging valve 13 is in the merging position A, pressure oil in the second hydraulic pump is supplied to (i.e., aids) the first discharge oil path 10 via the bypass oil path 36 and connecting oil path 12. Specifically, when the first hydraulic pump 2 requires capacity greater than its maximum, the required quantity of pressure oil is supplied to the first discharge oil path 10 from the second hydraulic pump 3 via the connecting oil path 12, thereby driving the first actuator 4 used for the arm.

At this time, the operating range of the first and second operating levers 29*a* and 30*a* for the corresponding works are detected through the respective pilot pressures of the first and second pilot-controlled directional control valves 5 and 8 in a manner similar to that in the first embodiment, and the respective operation patterns of the first and second actuators as well as the respective operating conditions of the operating levers 29*a* and 30*a* for the corresponding works are transmitted to the controller 14. Also in the second embodiment, an operation pattern storage section 42 in the controller 14 stores various operation patterns meeting the operating conditions of the first and second operating levers 29*a* and 30*a* for the corresponding works, and a pattern collating section 43 selects from the operation pattern storage section an operation pattern that matches each of the operation patterns transmitted from the first and second pilot-controlled directional control valves 5 and 8. Let us take by way of example a situation where the pressure of the second actuator 7 for the bucket rises in this operating condition such that the maximum values of the discharge pressures detected by the corresponding first and second pressure sensors 27 and 28 exceed the respective preset discharge pressures of the corresponding operation patterns during the operation. In this case, the controller 14 transmits a command signal to actuate the electromagnetic directional control valve 33, thereby switching the main merging/diverging valve 13 from the merging position to the diverging position, thus cutting off the connecting oil path 12. At this time, some of the pressure oil in the second discharge oil path 11 is supplied to the first actuator 4 through the bypass oil path 36.

When arm-side pressure exceeds bucket-side pressure after the main merging/diverging valve 13 is switched to the diverging position, the pressure compensation valve 37 with the checking function, which is provided for the bypass oil path 36, stops the flow of pressure oil into the arm. To be more specific, as the load pressure of the first actuator 4 for the arm increases, the aiding flow rate decreases so as to smoothly bring the main merging/diverging valve into a diverging state. In this case, the pressure applied by the first hydraulic pump 2 is 300 kgf/cm$^2$ and that by the second hydraulic pump 3 is 250 kgf/cm$^2$, for example. When the pressure of the first discharge oil path 10 on the supplied side (i.e., the side where one is merged with the other) is greater than the pressure of the second discharge oil path 11 on the supplying side (i.e., the side where one merges with the other) and the flow rate control valve 38 for operating the arm at a high speed is OFF (i.e., closed), the main merging/diverging valve 13 is brought into a diverging state.

Incidentally, the control procedure for switching the merging/diverging valve of a compound operation consisting of other working equipments is exerted in a similar manner described in the first embodiment and, therefore, detailed explanations thereof are not repeated here.

The invention claimed is:

1. A hydraulic control device of construction machinery the device comprising:

a plurality of variable capacity type hydraulic pumps;

a plurality of actuators driven by oil discharged by the plurality of variable capacity type hydraulic pumps;

a plurality of pilot-controlled directional control valves for switching directions of pressure oil supplied to the respective actuators;

a plurality of working equipment operating switch valves for supplying pilot pressures to the plurality of pilot-controlled directional control valves;

a plurality of operating levers for controlling switching of the respective working equipment operating switch valves;

a pressure compensation valve for compensating for a difference between pressures in front of and behind each of the pilot-controlled directional control valves so that the difference between the pressures has a predetermined value;

a main merging/diverging valve for switching between a merging position where the respective discharge oil paths for the respective variable capacity type hydraulic pumps are connected each other and a diverging position where the respective discharge oil paths are disconnected each other;

a plurality of load pressure introduction oil paths for supplying the respective pressure compensation valves with a load pressure with a highest pressure of load pressures of the plurality of actuators as a set pressure; and an auxiliary merging/diverging valve for switching between the merging position where the plurality of load pressure introduction oil paths are connected each other and the diverging position where the load pressure introduction oil paths are disconnected each other;

a plurality of discharge oil paths for connecting the respective variable capacity type hydraulic pumps and the plurality of pilot-controlled directional control valves;

operating condition input means for detecting pressures supplied to the pilot-controlled directional control valves;

discharge pressure detecting means for detecting discharge pressures of the respective variable capacity type hydraulic pumps; and a controller, wherein the controller comprises:

an operating condition judging section for judging an operating condition of each of the actuators based on a signal from the operating condition input means;

an operation pattern storage section for storing operation patterns formed in advance for the respective actuators for a variety of operating positions of the plurality of operating levers;

a pattern collating section for collating which one of the operation patterns stored in the storage section matches the operating condition judged by the operating condition judging section;

a discharge pressure storage section for storing information about discharge pressures set in advance for the respective operation patterns stored in the operation pattern storage section;

a command signal determination section for switching the main merging/diverging valve to a diverging side when a matching operation pattern is found as a result of a collation that an actual discharge pressure is higher than a set discharge pressure as a result of a comparison between the actual discharge pressure detected by each of the discharge pressure detecting means and the set discharge pressure for each of the operation patterns stored in the discharge pressure storage section, and for switching the main merging/diverging valve to a merging side when the actual discharge pressure is lower than the set discharge pressure; and a command signal output section for outputting a command signal given by the command signal determination section, wherein the controller switches the main merging/diverging valve from the merging position to the diverging position when the discharge pressure of one of the variable capacity type hydraulic pumps exceeds the set pressure while both the main and auxiliary merging/diverging valves are in their respective merging positions and the respective actuators are in operating condition, and then the controller switches the auxiliary merging/diverging valve to the diverging position from the merging position after discharge flow rates of the plurality of variable capacity type hydraulic pumps are adjusted.

2. The hydraulic control device of construction machinery according to claim 1, wherein the control device controls the main and auxiliary merging/diverging valves such that the auxiliary merging/diverging valve is switched from the diverging position to the merging position when the discharge pressure of one of the variable capacity type hydraulic pumps drops to below the set pressure while both the main and auxiliary merging/diverging valves are in their respective diverging positions and the respective actuators are in operating condition, and then the main merging/diverging valve is switched to the merging position from the diverging position after the respective actuators are compensated for pressures.

3. The hydraulic control device of construction machinery according to claim 1, further comprising a bypass oil path connecting, via a pressure compensation valve with a checking function, an oil path between the pressure compensation valve and the actuator on one variable capacity type hydraulic pump side and an oil path between another variable capacity type hydraulic pump and the main merging/diverging valve.

4. A hydraulic control device of construction machinery, comprising:

first and second variable capacity type hydraulic pumps;

a plurality of actuators driven by oil discharged by the first and second variable capacity type hydraulic pumps;

a plurality of pilot-controlled directional control valves for switching directions of pressure oil supplied to the respective actuators;

a plurality of working equipment operating switch valves for supplying pilot pressures to the plurality of pilot-controlled directional control valves;

a plurality of operating levers for controlling switching of the respective working equipment operating switch valves;

a pressure compensation valve for compensating for a difference between pressures in front of and behind each of the pilot-controlled directional control valve so that the difference between the pressures has a predetermined value;

a plurality of discharge oil paths for connecting the first and the second variable capacity type hydraulic pumps and the plurality of pilot-controlled directional control valves;

a main merging/diverging valve for switching between a merging position where a discharge oil path for the first variable capacity type hydraulic pump and a discharge oil path for the second variable capacity type hydraulic pump are connected and the diverging position where the discharge oil paths are disconnected;

a plurality of load pressure introduction oil paths for supplying the respective pressure compensation valves with a load pressure with a highest pressure of the load pressures of the plurality of actuators as a set pressure;

an auxiliary merging/diverging valve for switching between the merging position where the plurality of load pressure introduction oil paths are connected each other and the diverging position where the load pressure introduction oil paths are disconnected each other;

operating condition input means for detecting pressures supplied to the pilot-controlled directional control valves;

discharge pressure detecting means for detecting discharge pressures of the first and second variable capacity type hydraulic pumps; and a controller, wherein the controller comprises:

an operating condition judging section for judging an operating condition of each of the actuators based on a signal from the operating condition input means; an operation pattern storage section for storing operation patterns formed in advance for the respective actuators for a variety of operating positions of the plurality of operating levers;

a pattern collating section for collating which one of the operation patterns stored in the storage section matches the operating condition judged by the operating condition judging section;

a discharge pressure storage section for storing information about discharge pressures set in advance for the respective operation patterns stored in the operation pattern storage section;

a command signal determination section for switching the main merging/diverging valve to the diverging position from the merging position when a matching operation pattern is found as a result of a collation that an actual discharge pressure is higher than a set discharge pressure as a result of a comparison between the actual discharge pressure detected by each discharge pressure detecting means and the set discharge pressure for each operation pattern stored in the discharge pressure storage section, and then switching the auxiliary merging/diverging valve to the diverging position from the merging position after discharge flow rates of the plurality of variable capacity type hydraulic pumps are adjusted; and for switching the auxiliary merging/diverging valve to the merging position from the diverging position when the actual discharge pressure is lower than the set discharge pressure, and then switching the main merging/diverging valve from the diverging position to the merging position after the respective actuators are compensated for pressures; and a command signal output section for outputting a command signal given by the command signal determination section.

* * * * *